UNITED STATES PATENT OFFICE.

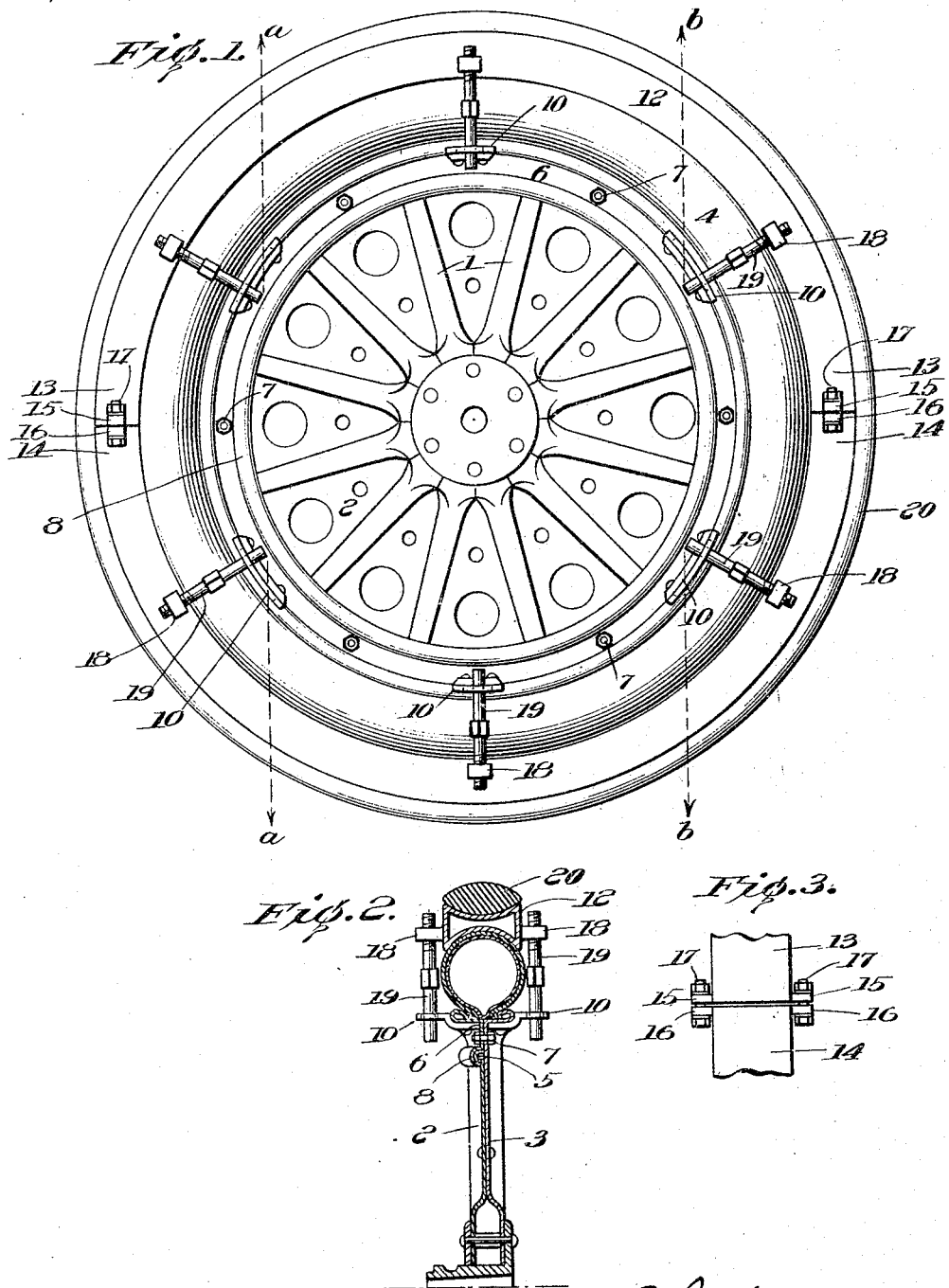

ALVIN DAHL, OF YARDLEY, PENNSYLVANIA.

TIRE-PROTECTOR.

1,209,130.        Specification of Letters Patent.        Patented Dec. 19, 1916.

Application filed June 5, 1912.   Serial No. 701,757.

*To all whom it may concern:*

Be it known that I, ALVIN DAHL, of Yardley, in the county of Bucks and State of Pennsylvania, have invented certain new and useful Improvements in Tire-Protectors; and I do hereby declare the following to be a full, clear, and exact description of the invention, such as will enable others skilled in the art to which it appertains to make and use the same.

My invention contemplates an improved protector for pneumatic tires having special reference to the tires of automobile wheels.

My purpose is to protect the tire from rough roads by means of a metallic ring which substantially incloses the tread portion of the tire and constitutes the tread proper of the wheel, without affecting the cushion action of the pneumatic tire.

In the accompanying drawing, Figure 1 is a side elevation of a vehicle wheel equipped with a protector embodying my invention. Fig. 2 is a transverse sectional view. Fig. 3 is a detail.

Referring to the drawing, the wheel is or may be of any preferred construction. I have shown the spokes 1 consisting of a pair of plates 2, 3, suitably mounted together. The plate 2 is shown terminating short of the pneumatic tire 4 and formed with a bead 5 at its upper extremity. A rim piece 6 is bolted to the plate 3 as at 7 and is formed with a curved extremity 8 to lock over the bead 5. The parts 3 and 6 constitute the tire rim. By this construction in order to remove the pneumatic tire 4 it is only necessary to withdraw the bolts 7 and remove plate 6.

At its periphery the wheel is provided on either side with a series of slotted plates 10. The metallic ring or tire protector is indicated at 12. This is preferably of steel and is made of two sections 13, 14 coupled together as at 15. The meeting edges are provided on either side with lugs 16 through which bolts 17 are passed.

I have shown the ring 12 formed with a plurality of threaded flanges 18 on both sides. Bolts 19 are held in these flanges and their lower ends project downward through the slotted plates 10. These plates hold the ring as against lateral displacement but permit the bolts to move within the limits of the slots so that the metallic ring may yield with the pneumatic tire. A further advantage of this construction is that it enables the ring to be readily removed when the sections are uncoupled at 15. I have shown the ring of concaved formation to fit the pneumatic tire and I have also shown it provided on its periphery with a resilient tread piece 20, preferably of hard rubber.

It will be noted that the plates 10 at the top and bottom of Fig. 1 are shorter than the others. When the sections are separated at 15 the bolts 19 move in the direction of the lines *a*, *b*, the length of the slots permitting their withdrawal, while the bolts at the top and bottom move outward at right angles to the plates and hence the slots of the latter may be shorter, thus preventing the protector from creeping.

I claim as my invention:—

In a vehicle wheel, spokes comprising each two plates united together, one of said plates terminating short of the other, a removable annular rim section secured to said shorter plate and constituting with the other plate a rim for a pneumatic tire, a series of slotted plates projecting laterally outward from said tire rim, a pneumatic tire on said rim, a metallic ring inclosing the tread surface of said tire, flanges on said ring, and bolts projecting radially from said flanges through said plates.

In testimony whereof, I have signed this specification in the presence of two subscribing witnesses.

ALVIN DAHL.

Witnesses:
J. C. WOODMAN,
RUSSELL C. ROSS.

Copies of this patent may be obtained for five cents each, by addressing the "Commissioner of Patents, Washington, D. C."